(12) United States Patent
Schadhauser

(10) Patent No.: US 11,186,025 B2
(45) Date of Patent: Nov. 30, 2021

(54) METHOD AND APPARATUS FOR PRODUCING FIBRE-REINFORCED PLASTIC MOULDINGS

(71) Applicant: KRAUSSMAFFEI TECHNOLOGIES GMBH, Munich (DE)

(72) Inventor: Maximilian Schadhauser, Unterhaching (DE)

(73) Assignee: KRAUSSMAFFEI TECHNOLOGIES GMBH, Munich (DE)

( * ) Notice: Subject to any disclaimer, the term of this patent is extended or adjusted under 35 U.S.C. 154(b) by 180 days.

(21) Appl. No.: 16/486,321

(22) PCT Filed: Feb. 8, 2018

(86) PCT No.: PCT/EP2018/053193
§ 371 (c)(1),
(2) Date: Aug. 15, 2019

(87) PCT Pub. No.: WO2018/153682
PCT Pub. Date: Aug. 30, 2018

(65) Prior Publication Data
US 2019/0381713 A1 Dec. 19, 2019

(30) Foreign Application Priority Data
Feb. 23, 2017 (DE) ...................... 10 2017 103 757.8

(51) Int. Cl.
*B29C 48/154* (2019.01)
*B29C 48/285* (2019.01)
*B29C 48/00* (2019.01)
*B29C 48/793* (2019.01)
(Continued)

(52) U.S. Cl.
CPC ........ *B29C 48/154* (2019.02); *B29C 45/0005* (2013.01); *B29C 48/022* (2019.02);
(Continued)

(58) Field of Classification Search
CPC .............................. B05B 7/1404; B05B 7/162
See application file for complete search history.

(56) References Cited

U.S. PATENT DOCUMENTS 5,094,883 A    3/1992   Muzzy et al.
5,134,959 A *   8/1992   Woodmansee ........ C03C 25/143
                                              118/308
(Continued)

FOREIGN PATENT DOCUMENTS

DE          4236662 C2    11/1991
DE   102014213320 A1    11/2015
(Continued)

OTHER PUBLICATIONS

Silva, R. F., Silva, J. F., Nunes, J. P., Bernardo, C. A., & Marques, A. T. (2008). New powder coating equipment to produce continuous fibre thermoplastic matrix towpregs. In Materials Science Fórum (vol. 587, pp. 246-250). Trans Tech Publications Ltd. (Year: 2008).*
(Continued)

*Primary Examiner* — Galen H Hauth
(74) *Attorney, Agent, or Firm* — Pearne & Gordon LLP

(57) ABSTRACT

A method and a device for producing fibre-reinforced plastic mouldings, using coated fibre strands. For the coating of the fibre strands, an air flow of ionised air is produced and guided through a Venturi nozzle. Powder from a storage container is taken by means of a screw conveyor and supplied to the Venturi nozzle, a flow of a powder-air mixture being present or forming behind the Venturi nozzle in the direction of flow. This stream is introduced into a chamber and fibre strands that are earthed or ionised unlike the powder are passed through the chamber and through the powder-air mixture flowing through the chamber, powder particles being deposited on the fibre strands. The fibre strands guided out of the chamber therefore have a coating,
(Continued)

and the fibre strands coated in this way are supplied to a plasticising device of an injection moulding machine or an extrusion machine.

10 Claims, 2 Drawing Sheets

(51) Int. Cl.
    *B29C 48/14*     (2019.01)
    *B29C 45/00*     (2006.01)
    *B29K 105/08*     (2006.01)
    *B29K 307/04*     (2006.01)

(52) U.S. Cl.
    CPC .......... *B29C 48/143* (2019.02); *B29C 48/287* (2019.02); *B29C 48/2886* (2019.02); *B29C 48/793* (2019.02); *B29C 2791/006* (2013.01); *B29K 2105/08* (2013.01); *B29K 2307/04* (2013.01)

(56) References Cited

U.S. PATENT DOCUMENTS

| | | | |
|---|---|---|---|
| 5,213,843 A | 5/1993 | Working | |
| 5,302,419 A * | 4/1994 | Muzzy | B29C 70/20 427/185 |
| 5,370,911 A | 12/1994 | Throne et al. | |
| 5,895,622 A * | 4/1999 | Ramani | D06M 10/025 264/440 |
| 6,186,769 B1 * | 2/2001 | Hawley | B29B 7/90 425/587 |
| 6,238,733 B1 | 5/2001 | Therolf | |
| 2004/0231598 A1 | 11/2004 | Werner | |
| 2008/0184793 A1 * | 8/2008 | Mauchle | G01F 23/268 73/290 R |
| 2010/0103763 A1 | 4/2010 | Ponzielli | |

FOREIGN PATENT DOCUMENTS

| | | |
|---|---|---|
| EP | 1144174 B1 | 12/1999 |
| EP | 0979719 A2 | 2/2000 |
| EP | 1306187 B1 | 9/2002 |
| JP | 2013-230582 A | 11/2013 |

OTHER PUBLICATIONS

International Search Report for PCT/EP2018/053193 dated May 4, 2018.

Written Opinion for PCT/EP2018/053193 dated May 4, 2018.

* cited by examiner

METHOD AND APPARATUS FOR PRODUCING FIBRE-REINFORCED PLASTIC MOULDINGS

CROSS-REFERENCE TO RELATED APPLICATIONS

This is a National Stage application of PCT international application PCT/EP2018/053193 filed on Feb. 8, 2018, which claims the priority of German Patent Application No. 10 2017 103 757.8, filed Feb. 23, 2017, which are incorporated herein by reference in their entireties.

BACKGROUND OF THE INVENTION

For the manufacture of fibre-reinforced plastic products, it is known to mix continuous fibre strands into molten plastic material in a plasticizing device and feed the material thus mixed to a shaping device. The shaping device can be an injection moulding tool or an extrusion tool. Depending on the shaping device, the plasticizing device can be differently configured. In the case of an injection moulding tool, the plasticizing device can, for example, be configured as a double screw extruder with axially non-displaceable screws and the material can be introduced into the injection moulding tool by means of a downstream injection unit. It is also known to provide a screw pre-plasticization using a single screw and introduce the material into the injection moulding tool by means of a downstream injection unit. In this case, during the screw pre-plasticization the screw can be axially fixed or however it can also be configured as a reciprocating screw. In the last-mentioned case, both a rotational drive and a linear drive are provided. In the case of an injection moulding tool, the plasticizing device can also be configured only with a reciprocating screw, i.e. the plasticizing and the injection are accomplished with one and the same screw. In the case of an extrusion tool, the plasticizing device can be configured as a single-screw or as a multiple-screw extruder, for example, as a double-screw extruder. Known plasticizing devices of the aforesaid types are disclosed, for example, in EP1144174B1, EP1306187B1 and DE423662C2.

It is known from U.S. Pat. No. 5,094,883 to apply a powder material to fibre strands. The fibre strands to be coated are initially earthed and then guided through a housing in which these fibre strands are exposed to a powder-air mixture. A so-called fluidized bed method is used to produce the powder-air mixture. Arranged in a housing is a porous plate which can be made to vibrate. A certain quantity of powder is placed on this plate and there forms a powder supply. Underneath the porous plate, the housing is connected to a channel through which dried air can be introduced from below into the housing. Located underneath the porous plate is an ionizer by means of which the inflowing air can be ionized. The ionized air is guided through the porous plate and through the powder. In so doing, powder is raised from the porous plate and forms together with the ionized air a powder-air mixture at a distance above the porous plate. If a fibre strand is moved through this powder-air mixture, powder is deposited on the fibre strand. The fibre strand is then moved through a furnace to melt the powder and achieve a good adhesion of the powder to the fibre strand. Fibre strands thus coated are then fed to a roll where the fibre strands are wound and ultimately a supply of coating fibre material is formed.

It is known from DE102014213320A1 to coat a workpiece with powder by means of a spray gun (Paragraph [0019]). In this case, a powder-air mixture which behaves like a liquid is produced in a storage container. It is also said that the powder is "fluidized" in the storage container. This fluidized powder then flows through hoses or tubes to application devices such as a spray gun with an appropriate nozzle. A spray electrode is provided in order to electrically charge the powder particles. The charged powder is sprayed by means of the spray gun and sticks to the earthed workpiece. According to DE102014213320A1, the workpieces to be coated can comprise those workpieces which substantially, i.e., for example, at least 50 weight percent, preferably at least 75 weight percent or exclusively, consist of carbon fibres. The term "carbon fibres" covers individual fibres or thread but also knitted fabrics, braided fabrics, crocheted fabrics, woven fabrics, screw or the like, formed therefrom.

In the previously known powder coating methods, the powder can certainly be applied comparatively homogeneously to fibre strands. A disadvantage however is that the layer thickness or the powder content per quantitative unit of fibre strand (e.g. per kg of fibre strand) cannot be adjusted or at least cannot be adjusted sufficiently precisely. This would have a disadvantageous effect when such coated fibre material is directly processed to form a mixture of plastic melt and fibre material. Specifically, mouldings having a defined proportion of coating material on the incorporated fibre strands could not be produced.

BRIEF SUMMARY OF THE INVENTION

Starting from this, it is the object of the invention to provide a method and a device for producing fibre-reinforced plastic mouldings, wherein the plastic mouldings are mixed with fibres which have a defined proportion of coating material.

This object is solved by a method having the features of claim 1 and a device having the features of claim 5. Advantageous configurations and further developments are found in the dependent claims.

The core idea of the invention can be seen in that the fibre strands are coated homogeneously with a defined quantity of powder per unit time or per unit fibre length. For this purpose it is provided according to the invention that for coating the fibre strands, initially an air stream of ionized air is produced and guided through a Venturi nozzle, that powder is removed from a storage container by means of a screw conveyor and supplied to the Venturi nozzle, that a stream of a powder-air mixture is formed in the direction of flow downstream of the Venturi nozzle and this stream is introduced into a chamber, that fibre strands that are earthed or ionized opposite to the powder are passed through the powder-air mixture flowing through the chamber, wherein powder particles are deposited on the fibre strands and the fibre strands guided out of the chamber have a coating having a defined quantity of powder per unit length or per unit fibre length. The fibre strands thus coated are supplied to a plasticizing device in which the fibre strands are drawn in by a single screw or a double screw and are incorporated into a molten plastic material, wherein a mixture of plastic melt and fibre material is produced and this mixture is supplied to a shaping device. The fibre-reinforced plastic mouldings produced in this way are characterized in that the fibres present in the plastic moulding have a defined proportion of coating material.

According to the invention, two variants are thus provided in order to achieve a sufficient adhesion of the powder material to the fibre strands. In the first variant only the powder is ionized and the fibre material is earthed. If a higher adhesion is desired or should be necessary, according to a second variant it can be provided that the powder is positively ionized and the fibre strands are negative (or conversely).

Further advantages can be achieved by means of the choice of coating material. In particular, if the coating materials was selected so that the viscosity of the molten plastic in the plasticizing device is severely reduced in the direct surroundings of the supplied fibre strand provided with the coating material, the wetting of the individual filaments of the fibre strand provided with coating material can be significantly facilitated. Specifically, these coated filaments are directly impregnated with this plastic material on first contact with the molten plastic material in the plasticizing device before they could be compacted to form agglomerates. As a result of this early avoidance of agglomerate formation, there is also no need to solubilize these agglomerates, for example, by strongly shearing dispersion zones. The absence of strongly shearing dispersion zones in turn results in a higher average fibre length in the component which is then reflected positively in the mechanical properties.

Preferably the screw conveyor is operated in an underlaid manner. In cooperation with the Venturi nozzle and the negative pressure prevailing there, a closed system is formed. This has the advantage that the chamber into which the powder particles are metered forms sufficient space for a turbulent flow profile since the space is not filled with deposited powder particles. The turbulent flow profile in turn results in a uniform application of powder to the entire surfaces of the fibre strand guided through.

Preferably the air is heated before it is guided through the Venturi nozzle. This helps to ensure that the air is as dry as possible during the formation of the powder-air mixture. In addition, the fibre strands are thereby heated and in consequence, the molten plastic material in the plasticizing device into which the coated fibre strands are introduced does not solidify upon first contact with the fibres. Accordingly, the wetting of the fibres is improved.

Furthermore, it can be advantageous if the air is heated to a temperature at which the powder particles start to melt. This is the case at temperatures more or less above 110° C. depending on the material used.

An apparatus according to the invention substantially comprises a fibre coating device, a plasticizing device having a single or a double screw as well as a shaping device. The fibre coating device has a chamber through which fibre strands can be passed and through which a stream of a powder-air mixture can be guided. The apparatus according to the invention is characterized inter alia by the fact that the fibre coating device has an air channel connected to the chamber and fitted with a Venturi nozzle through which ionized air can be fed to the Venturi nozzle and guided through this and is further characterized by the fact that the fibre coating device has a powder storage container with a screw conveyor, wherein the outlet end of the screw conveyor is arranged in such a manner that powder conveyed by the screw conveyor can flow into the Venturi nozzle and mix with the ionized air in order to be able to produce a stream of a powder-air mixture.

In a preferred embodiment, the chamber can have a membrane on its upper side, which is air-permeable but is impermeable for the powder from the powder storage container. This is advantageous so that the air required for the uniform transport of the powder can escape from the chamber but equally it is ensured that the metered-in quantity of powder is also completely applied to the fibres and does not partly exit together with the air from the chamber.

Preferably a heating device is provided in the air channel which is arranged preferably upstream of the Venturi nozzle in the flow direction. As a result, the air can be dried and heated. With the heating device it is possible to heat the air to a temperature at which the powder particles begin to melt. This improves the adhesion of the coating material to the surface of the fibre strands.

In an advantageous manner, a suitable ionizing device known per se can be provided in order to be able to produce ionized air and introduce it into the air channel. This saves the installation of ionizing devices in the air channel itself.

An extrusion tool or an injection moulding tool can be provided as shaping device. In particular, a so-called injection moulding compounder having a single screw or double screw extruder rotating in the same direction can be provided as injection moulding machine.

BRIEF DESCRIPTION OF THE DRAWINGS

The invention will be described in detail hereinafter with reference to exemplary embodiments and with reference to FIGS. 1 and 2.

DESCRIPTION OF EXAMPLE EMBODIMENTS

Figure 1:
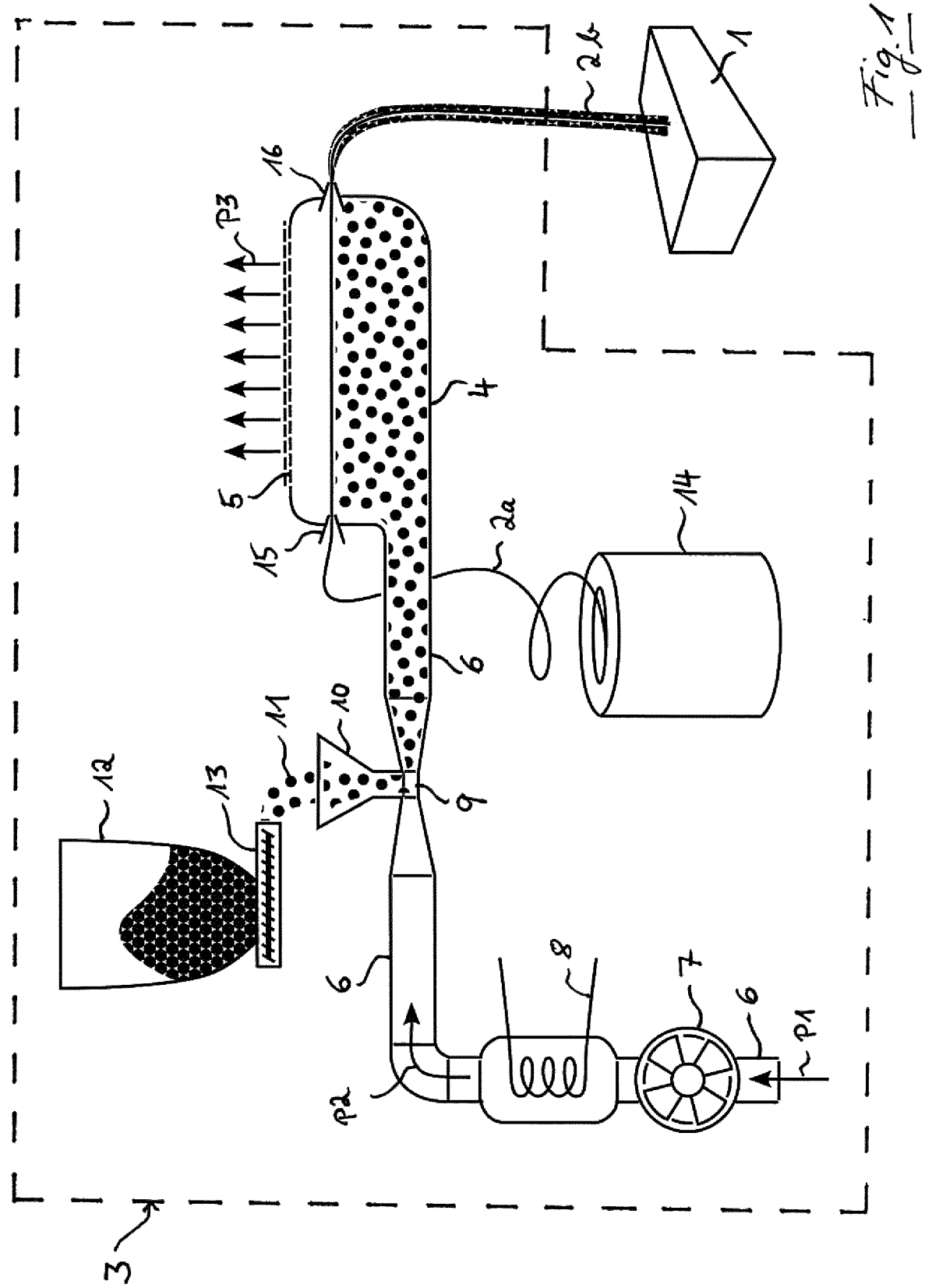

FIG. 1 shows schematically the structure of an apparatus according to the invention. The reference number 1 designates an injection moulding machine or an extrusion machine such as are each known per se (see, e.g. EP1144174B1, EP1306187B1 or DE4236662C2); thus, a more detailed description can be omitted at this point. The reference number 2b designates fibre strands which are already coated and are supplied to the plasticizing unit of the injection moulding machine or the extrusion machine 1. The fibre coating device provided overall with the reference number 3 substantially comprises a chamber 4 which is closed by an air-permeable membrane 5. An air channel 6 is connected to the underside of the chamber 4. The air channel 6 is fitted with a plurality of devices, namely a fan 7, a heater 8 and a Venturi nozzle 9. A funnel 10 is provided on the upper side of the Venturi nozzle 9, through which the coating material present as powder 11 is introduced into the Venturi nozzle 9. The powder 11 is held in readiness in a storage container 12 and is removed from the storage container via a screw conveyor 13. The outlet end of the screw conveyor 13 is arranged in such a manner that powder 11 conveyed by the screw conveyor 13 can drop into the funnel 10 and thus flow into the Venturi nozzle 9 and can mix there with the ionized air. Downstream of the Venturi nozzle 9, there is thus a stream of a powder-air mixture. Not shown is a device known per se for ionizing air. The arrow P1 is merely intended to indicate that air which had previously been ionized is introduced into the channel 6. At the arrow P2 the air has already passed the heater 8 and is correspondingly heated.

Uncoated fibre strands 2a are held in readiness on a supply roll 14 or the like and withdrawn from there. The withdrawing is accomplished by means of the screw or the screws of the plasticizing device in the machine 1. The fibre strands 2a should be earthed. The chamber 4 has suitable inlet and outlet devices 15, 16 in order to draw the fibre strands 2a into the interior of the chamber 4 as free from friction a possible and in order to be able to guide the coated fibre strands 2b out of the chamber 4. In particular, these inlet and outlet device can be configured to be funnel-shaped, as is indicated in FIG. 1.

The operating mode of the apparatus according to the invention is as follows. Ionized air is sucked into the air channel 6 as indicated by the arrow P1 by means of the fan 7, heated by the heating device 8 and passed through the Venturi nozzle 9. From the storage container 12 by means of the screw conveyor 13 in underlaid mode, a precisely measured quantity of powder per unit time is introduced into the funnel 10 and thus into the Venturi nozzle 9. The air flow in the air channel 6 is thus mixed with a precisely measured quantity of powder per unit time and the powder is charged by the ionized air. This powder-air mixture flows further through the air channel 6 and enters under the underside of the chamber 4 into this chamber. As indicated by the arrows P3, the air is removed into the open via the membrane 5. The fibre strands are guided transversely through the chamber 4, wherein a substantially horizontal position of the fibre strands is preferred. The flow direction of the powder-air mixture is substantially vertically aligned. Whilst the fibre strands are moved through the chamber 4, they are continuously exposed to the powder-air mixture and the charged powder can be deposited on the earthed fibre strands. In this case, a precisely measured quantity of powder per unit time is applied to the fibre strands. The fibre strands 2b coated in this way are supplied to the plasticizing device of the machine 1 or drawn in by this and incorporated into a molten plastic material. In this way, a mixture of plastic melt and fibre material is produced and this mixture is subsequently fed to a shaping device.

Figure 2:
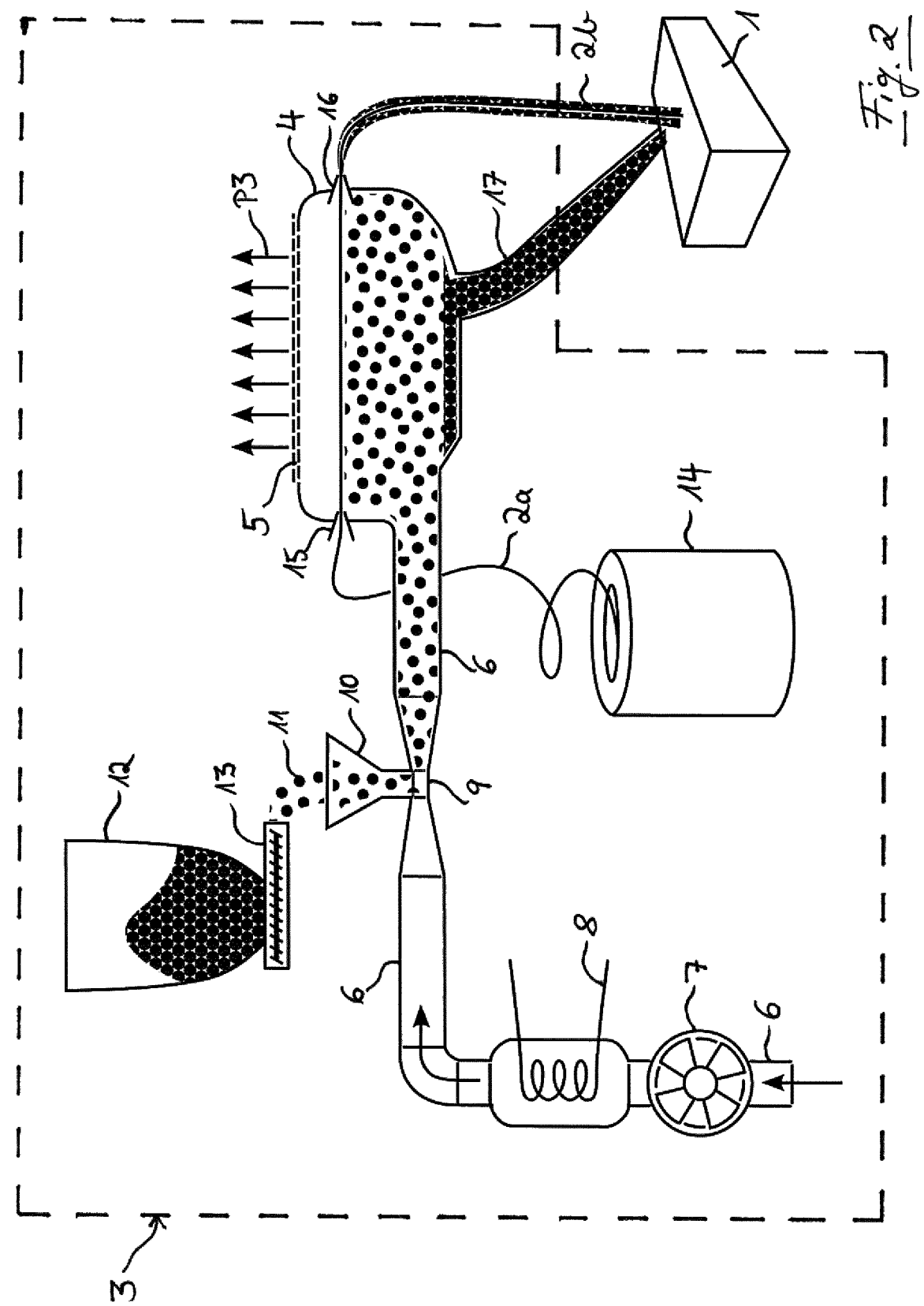

FIG. 2 differs from FIG. 1 in that in this variant a connection for a tube 17 is provided on the base of the chamber 4, which tube extends as far as the plasticizing machine 1. As a result, powder deposits on the base of the chamber 4 can be conveyed via the tube 17 into the fibre intake opening of the plasticizing device of the machine 1. This has the advantage that possible deposits of powder material on the base of the chamber 4 can be prevented. It can thus be ensured that an exactly desired quantity of powder 11 is located in the ready-formed fibre-reinforced plastic moulding. The quantity of powder 11 in this plastic moulding is then composed of powder 11 or powder material that is present as coating material on the fibres of the coated finber strand 2b and powder 11 or powder material which has been mixed directly into the molten plastic material and is present so to speak distributed between the coated fibres in the plastic moulding. The exit of air from this additional opening in the chamber 4 could be reduced to a minimum if the tube has a very narrow flow cross-section but a large length.

| REFERENCE LIST | |
|---|---|
| 1 | Injection moulding or extrusion machine |
| 2a | Fibre strands - uncoated |
| 2b | Fibre strands - coated |
| 3 | Fibre coating device |
| 4 | Chamber |
| 5 | Membrane |
| 6 | Air channel |
| 7 | Fan |
| 8 | Heater |
| 9 | Venturi nozzle |
| 10 | Funnel |
| 11 | Powder |
| 12 | Storage container |
| 13 | Screw conveyor |
| 14 | Fibre roll |
| 15 | Fibre inlet device |
| 16 | Fibre outlet device |
| 17 | Tube |

What is claimed is:

1. A method for producing fibre-reinforced plastic mouldings, wherein fibre strands are coated and fed to a plasticizing device in which fibre strands are drawn in by a single screw or a double screw and incorporated into a molten plastic material, wherein a mixture of plastic melt and fibre material is produced and this mixture is supplied to a shaping device, wherein for coating the fibre strands initially an air stream of ionized air is produced and guided through a Venturi nozzle, wherein powder is removed from a storage container by means of a screw conveyor and supplied to the Venturi nozzle, wherein a stream of a powder-air mixture is formed in the direction of flow downstream of the Venturi nozzle and this stream is introduced into a chamber, wherein fibre strands that are earthed or ionized opposite to the powder are passed through the powder-air mixture flowing through the chamber, wherein powder particles are deposited on the fibre strands and the fibre strands guided out of the chamber have a coating and wherein the fibre strands thus coated are supplied to the plasticizing device.

2. The method according to claim 1, wherein the screw conveyor is operated in an underlaid manner.

3. The method according to claim 1, wherein the air is heated before it is guided through the Venturi nozzle.

4. The method according to claim 3, wherein the air is heated to a temperature at which the powder particles start to melt.

5. An apparatus for carrying out the method according to claim 1, comprising a fibre coating device, a plasticizing device having a single or a double screw as well as a shaping device, wherein the fibre coating device has a chamber through which fibre strands can be passed and through which a stream of a powder-air mixture can be guided, wherein the chamber has a base and an opposite upper side, wherein the fibre coating device furthermore has an air channel connected to the chamber and fitted with a Venturi nozzle through which ionized air can be fed to the Venturi nozzle and guided through this and wherein the fibre coating device has a powder storage container with a screw conveyor, wherein the outlet end of the screw conveyor is arranged in such a manner that powder conveyed by the screw conveyor can flow into the Venturi nozzle and mix with the ionized air in order to be able to produce a stream of a powder-air mixture.

6. The apparatus according to claim 5, wherein the chamber has a membrane on its upper side, which is air-permeable but is impermeable for the powder from the powder storage container.

7. The apparatus according to claim 5, wherein a heating device is provided in or on the air channel which is arranged upstream of the Venturi nozzle in the flow direction.

8. The apparatus according to claim 5, wherein an ionizing device is provided in order to be able to produce ionized air.

9. The apparatus according to claim 5, wherein the shaping device comprises an extrusion tool or an injection moulding tool.

10. The apparatus according to claim 5, wherein a tube is provided, of which one end is mounted on the base of the chamber and of which the opposite end opens into an opening of the plasticizing device, into the fibre intake opening.

* * * * *